(12) United States Patent
Nemoto et al.

(10) Patent No.: US 6,368,750 B1
(45) Date of Patent: *Apr. 9, 2002

(54) LITHIUM SECONDARY BATTERY

(75) Inventors: Hiroshi Nemoto; Michio Takahashi; Kenshin Kitoh, all of Nagoya (JP)

(73) Assignee: NGK Insulators, Ltd., Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,530

(22) Filed: Jul. 7, 1999

(30) Foreign Application Priority Data

Jul. 13, 1998 (JP) .......................... 10-197853
Nov. 20, 1998 (JP) .......................... 10-331449

(51) Int. Cl.⁷ ............................. H01M 4/58
(52) U.S. Cl. ............ 429/231.95; 429/224; 429/231.5; 429/223; 429/231.6
(58) Field of Search ................. 429/231.95, 231.9, 429/218.1, 231.5, 224, 223, 229, 231.2, 231.1, 231.6

(56) References Cited

U.S. PATENT DOCUMENTS

| | | | |
|---|---|---|---|
| 5,147,738 A | 9/1992 | Toyoguchi | |
| 5,605,773 A | 2/1997 | Ellgen | |
| 5,780,181 A | * 7/1998 | Idota et al. | 429/194 |
| 5,869,208 A | * 2/1999 | Miyasaka | 429/224 |
| 5,958,624 A | * 9/1999 | Frech et al. | 429/231.95 |
| 6,040,089 A | * 3/2000 | Maney et al. | 429/231.1 |
| 6,071,645 A | * 6/2000 | Biensan et al. | 429/223 |

FOREIGN PATENT DOCUMENTS

| | | |
|---|---|---|
| EP | 0 696 075 | 2/1996 |
| EP | 0 744 780 | 11/1996 |
| EP | 0 782 206 | 7/1997 |
| EP | 0 794 585 | 9/1997 |
| FR | 2 738 673 | 3/1997 |
| JP | 1-265456 | 10/1989 |
| JP | 3-201368 | 9/1991 |
| JP | 4-237970 | 8/1992 |
| JP | 6-283174 | 10/1994 |
| JP | 6-295726 | 10/1994 |
| JP | 8-78013 | 3/1996 |
| JP | 8-315819 | 11/1996 |
| JP | 9-35712 | 2/1997 |
| JP | 9-147867 | 6/1997 |
| JP | 9-171824 | 6/1997 |
| JP | 9-194214 | 7/1997 |
| JP | 9-245838 | 9/1997 |
| JP | 9-259863 | 10/1997 |
| JP | 9-270259 | 10/1997 |
| JP | 9-293512 | 11/1997 |
| JP | 10-92429 | 4/1998 |
| JP | 10-106624 | 4/1998 |
| JP | 11-71115 | 3/1999 |
| JP | 11-73960 | 3/1999 |
| JP | 11-73962 | 3/1999 |
| JP | 11-111291 | 4/1999 |
| JP | 3031546 | 2/2000 |
| JP | 2000-48818 | 2/2000 |
| JP | 2000-67864 | 3/2000 |
| WO | WO 98/02928 | 1/1998 |
| WO | WO 98/06670 | 2/1998 |
| WO | WO 98/24131 | 6/1998 |
| WO | WO 98/38648 | 9/1998 |
| WO | WO 98/57386 | 12/1998 |
| WO | WO 99/01903 | 1/1999 |

OTHER PUBLICATIONS

Gao, Yuan et al., "Novel $LiNi1-xTix/2Mgx/2$ Compounds as Cathode Materials for Safer Lithium–Ion Batteries," Electrochemical and Solid–State Letters, vol. 1, No. 3, Sep. 1998, pp. 117–119, XP000859260.

Pistoia, G., et al., "Doped Li–Mn Spinel: Physical/Chemical Characteristics and Electrochemical Performance in Li Batteries," Chemistry of Materials, vol. 9, No. 6, 1997, pp. 1443–1450, XP002121765.

Chemical Abstract, vol. 127, No. 22, Dec. 1, 1997, Columbus, Ohio, Abstract No. 309488, Wakihara, Masataka et al., "Substitued Spinel Type Lithium Manganese Oxide Cathods and Secondary Lithium Batteries," XP00212766.

Patent Abstracts of Japan, vol. 1995, No. 10, Nov. 30, 1995 & JP 07 192719 (Sanyo Electric Co., Ltd.), Jul. 28, 1995.

\* cited by examiner

Primary Examiner—Stephen Kalafut
Assistant Examiner—R Alejandro
(74) Attorney, Agent, or Firm—Burr & Brown

(57) ABSTRACT

A lithium secondary battery has small internal resistance and has good charge-discharge cycle characteristics, with a lithium transition metal compound being used as a positive active material. A portion of transition element Me in a lithium transition metal compound $LiMe_xO_Y$ to be used as a positive active material is substituted by not less than two substitution elements M selected from the group consisting of Li, Fe, Mn, Ni, Mg, Zn, B, Al, Co, Cr, Si, Ti, Sn, P, V, Sb, Nb, Ta, Mo, and W. To provide $LiM_ZMe_{N-Z}O_Y$ wherein $M \neq Me$

16 Claims, No Drawings

LITHIUM SECONDARY BATTERY

BACKGROUND OF THE INVENTION AND RELATED ART STATEMENT

The present invention relates to, among secondary batteries to be used as an operational power source for portable electronic equipment, or as a motor driving battery for an electric vehicle or a hybrid electric vehicle, etc., a lithium secondary battery which has small internal resistance and has good charge-discharge cycle characteristics, with a lithium transition metal compound being used as a positive active material.

In recent years, miniaturization to go with lighter weight is being investigated in an accelerated fashion with respect to electronic equipment such as a personal handy phone system, a video tape recorder, a notebook-sized personal computer, etc., and a secondary battery comprising a lithium transition metal compound as a positive active material, with a carbon material as a negative material, and an electrolyte obtained by dissolving a Li ion electrolyte in an organic solvent, has become common as the power source battery.

Such a battery is generally called a lithium secondary battery or a lithium ion battery, and since they are provided with larger energy density as well as with higher unit cell voltage of approximately 4V, attention is being paid to these batteries not only for the aforementioned electronic equipment but also as a motor driving power source for an electric vehicle or a hybrid electric vehicle which is under consideration for positive proliferation to the general public as a low pollution vehicle, in view of the recent environmental problems.

In such a lithium secondary battery, its battery capacity as well as its charge-discharge cycle characteristics (hereinafter called "cycle characteristics") heavily depends on the material characteristics of the positive active material to be used. The lithium transition metal compound to be used as the positive active material includes lithium cobalt oxide ($LiCoO_2$), lithium nickel oxide ($LiNiO_2$), or lithium manganese oxide ($LiMn_2O_4$), etc. in particular.

Here, $LiCoO_2$ as well as $LiNiO_2$ comprises such features as a large Li capacity, a simple configuration, and excellent reversibility, and is provided with a two dimensionally layered configuration that is excellent in ion diffusion. On the other hand, however, as concerns $LiCoO_2$, producing areas of Co are limited and it hardly is true that output quantity is abundant. Accordingly, these materials are expensive, and thus there is a cost issue and a problem that its output density is smaller compared with $LiMn_2O_4$. In addition, as concerns $LiNiO_2$, synthesis of compounds of stoichiometric composition is difficult since the trivalent status of Ni is comparatively unstable, and in the case where detachment of Li becomes abundant, Ni will become subject to transition to bivalent status, emitting oxygen to constitute NiO, which creates problems such that the battery will stop functioning as a battery and there is a risk of battery explosion due to oxygen detachment.

On the contrary, $LiMn_2O_4$ has a feature that raw materials are inexpensive and larger output density as well as higher voltage is provided. However, in the case where $LiMn_2O_4$ has been used as a positive active material, there is a problem that repetition of charging-discharging cycle gradually decreases discharge capacity and good cycle characteristics will not become obtainable. It is deemed that the major cause of this is reduction of the positive capacity since crystal configuration changes irreversibly due to insertion and detachment of $Li^+$.

Thus, a lithium transition metal compound such as $LiCoO_2$, etc. respectively has both advantages and disadvantages together as a positive active material, and therefore, there are no rules which substances must be used, and it is deemed advisable that a positive active material which can show an appropriate feature for a particular purpose should be suitably selected for use.

Incidentally, regardless of the kind of positive active material, it is preferred in terms of characteristics of a battery that the internal resistance of the battery is small, and it is a common problem to all the positive active materials to be solved that resistance in a positive active material (namely electronic conduction resistance) should be reduced, or in other words, electronic conductivity should be improved for this reduction of the internal resistance. Particularly, in a lithium secondary battery of large capacity used as a motor driving battery for an electric vehicle, etc., it is very important to obtain large current output necessary for acceleration and gradeability, etc. to improve charging-discharging efficiency.

Under the circumstances, conventionally, trials to improve electronic conductivity by adding to a positive active material conductive fine grains such as acetylene black, etc. to reduce internal resistance of a battery have been conducted. This is becaused the above-described lithium transition metal compound is a mixed conducting body comprising both lithium ion conductivity and electronic conductivity together, but its electronic conductivity is not always strong.

However, there is a problem that addition of acetylene black causes reduction of filling quantity of a positive active material to reduce battery capacity. In addition, it is deemed that improvement of electronic conductivity is not unlimited since acetylene black is a kind of carbon and is a semiconductor. Moreover, acetylene black is voluminous and presents such a problem that it is difficult to handle when an electrode plate is to be produced. Accordingly, the volume of its addition is to be limited to an appropriate quantity, comparing and considering the advantageous effect of reduction of internal resistance, the disadvantageous effect of reduction of battery capacity, and the simplicity in production, etc.

Now, as described above, in the case where acetylene black has been added, acetylene black exists only on surfaces of particles of a positive active material, resulting in contributing to improvement of electronic conductivity among particles of positive active material, but not resulting in contributing to improvement of electronic conductivity inside a particle of a positive active material. Thus, conventionally, for improving electronic conductivity of a positive active material, attention was only paid to electronic conductivity among particles of a positive active material, but the relationship between diffusion of $Li^+$ and electronic conductivity inside a particle of a positive active material at the time of battery reaction was not regarded as a problem.

In short, detachment of $Li^+$ from a particle of a positive active material as well as insertion of $Li^+$ to a particle of a positive active material is proceeded by diffusion of $Li^+$ inside a particle of a positive active material, simultaneously accompanied by transfer of electrons taking place inside a particle of a positive active material, and at this time, if electronic conductivity inside a particle of a positive active material is low, diffusion of $Li^+$ hardly is apt to take place and velocity of detachment and insertion of $Li^+$, namely velocity of battery reaction, becomes slow, resulting in an increase in internal resistance, which was not taken into consideration at all.

The present inventors paid attention to this point, and considered in earnest to improve electronic conductivity of a positive active material itself so that diffusion of $Li^+$ inside a positive active material may proceed well, thus reducing resistance of the positive active material itself, and at the same time, when a battery has been assembled without increasing volume of acetylene black to be added, internal resistance of that battery may be reduced, and as a result the present invention has been achieved.

SUMMARY OF THE INVENTION

According to an aspect of the present invention, there is provided a lithium secondary battery, comprising a lithium transition metal compound $LiMe_XO_Y$, in which a portion of transition element Me is substituted by not less than two additional elements selected from the group consisting of Li, Fe, Mn, Ni, Mg, Zn, B, Al, Co, Cr, Si, Ti, Sn, P, V, Sb, Nb, Ta, Mo, and W to constitute $LiM_ZMe_{X-Z}O_Y$ (herein M represents substitution elements, and M≠Me, and Z represents quantity of substitution) the $LiM_ZMe_{X-Z}O_Y$ being used as a positive active material.

In the present invention, not less than 2 kinds of elements are preferably selected as the substitution elements M among the above-described group of elements, particularly Li, Fe, Mn, Ni, Mg, Zn, Si, Ti, Sn, P, V, Sb, Nb, Ta, Mo, and W, and it is especially preferred that at least Ti is included. It is also preferred that a portion of the remaining transition elements Me in $LiM_ZMe_{X-Z}O_Y$ to include not less than two kinds of substitution elements M to be obtained this way is also preferably substituted further by at least one element selected among B, Al, Co, and Cr. Also it is preferred that in a lithium transition metal compound $LiM_ZMe_{X-Z}O_Y$, Z/X, the ratio of the substitution quantity Z of substitution elements M and Me quantity X of the original transition elements, fulfills the condition of $0.005 \leq Z/X \leq 0.3$.

Incidentally, as one of lithium transition metal compounds to be suitably used in the present invention, lithium manganese oxide, especially a lithium manganese oxide having a spinel configuration of cubic system, may be nominated. The average valence of substitution elements M to substitute a portion of manganese in such lithium manganese oxide is set at not less than 3 but not more than 4. Here, an average valence is an average value of ion valence of not less than two different substitution elements M in a positive active material. Here, in the case where lithium manganese oxide has been used, a substitution quantity Z preferably remains within a range of $0.01 \leq Z \leq 0.5$ and more preferably fulfills a condition of $0.1 \leq Z \leq 0.3$.

In addition, in the present invention, lithium cobalt oxide or lithium nickel oxide is suitably used as a lithium transition metal compound. In the case where such materials have been used, it is preferred that the average valence of substitution elements M to be substituted with a portion of cobalt or nickel in lithium cobalt oxide or lithium nickel oxide is 3. However, the case where all the substitution elements M have the ion valence of 3 is excluded. Here, the substitution quantity Z preferably remains within the range of $0.005 \leq Z \leq 0.3$, and further preferably fulfills the condition of $0.05 \leq Z \leq 0.3$.

$LiM_ZMe_{X-Z}O_Y$ to be used in the above-described lithium secondary battery of the present invention is composed by firing a mixed compound comprising salts and/or oxides having been prepared with a predetermined ratio in an oxidation atmosphere in a temperature range of 600° C. to 1000° C., for 5 hours to 50 hours. At this time, also suitably adopted is such a method that is conducted, dividing firing into not less than twice, with the firing temperature for the forthcoming step to be set higher than that for the previous step, and thus proceeding with the composition. Here, in the case where a plurality of firing steps is conducted, the final firing is to be conducted under a firing condition involving an oxidation atmosphere in a temperature range of 600° C. to 1000° C., for 5 hours to 50 hours.

DETAILED DESCRIPTION OF PREFERRED EMBODIMENT

In a lithium secondary battery of the present invention, a portion of transition element Me of a lithium transition metal compound $LiMe_XO_Y$ is substituted by not less than two elements to constitute $LiM_ZMe_{X-Z}O_Y$, the $LiM_ZMe_{X-Z}O_Y$ being used as a positive active material. Here, M represents substitution elements, and substitution elements M are the one which are different from a transition element Me (M≠Me), and Z represents quantity of substitution. Strictly, since not less than two kinds of substitution elements M are involved, the chemical formula of the positive active material is described as $Li((M_1)_{x1}(M_2)_{x2} \ldots (M_n)_{xn})_ZMe_{X-Z}O_Y$ (herein, $M_1, M_2, \ldots,$ and $M_n$ represent respectively different elements, and the total sum of $x_1$ to $x_n$ is 1) for substitution by n-numbered kinds of elements. Incidentally, element substitution of the present invention involving such plural elements will be hereinafter called "complex substitution".

As substitution elements M, not less than two elements are selected from the group consisting of Li, Fe, Mn, Ni, Mg, Zn, B, Al, Co, Cr, Si, Ti, Sn, P, V, Sb, Nb, Ta, Mo, and W. These elements were determined by applying Hume-Rothery's rule to an ionic radius introduced by SHANNON, et al which has been described in Acta Cryst. (1976). A32, 751, and for the ion radius of transition element Me to be substituted in a space group R(−3)m (herein "−" represents rotation-inversion) or in Fd3m (a spinel configuration), a condition that the coordination number for oxygen is the same as that for the transition element Me and the average ionic radius of the substitution elements M remains within ±15% of the ionic radius of the transition element Me, and is not a radioactive element nor a gas, and not strongly toxic having been fulfilled so as to select a combination of elements. Here, as a transition element Me, Mn, Co, and Ni to be suitably used in the present invention are regarded as a standard.

An ionic radius of substitution elements M is referred to an average value of ionic radius of not less than 2 kinds of elements, and is determined in consideration of existence ratio of each element. In the present invention, it is preferable that all the ionic radii of the substitution elements M remains within ±15% of the ionic radius of the transition element Me, but in the case where such a condition may not be fulfilled, for example even in the case of the substitution element $M_1$ numbered 1 with its ionic radius far larger than the range of ±15% of the ionic radius of the transition element Me, and the substitution element $M_2$ numbered 2 with its ionic radius far smaller than the range of −15% of the ionic radius of the transition element Me, if an average ionic radius of the substitution elements $M_1$ and $M_2$ falls in the range of ±15% of the ionic radius of the transition element Me, complex substitution is feasible.

However, in the case where Li is used, Li can be used as a substitution element M, exceptionally, even when the above-described conditions on ionic radius are not fulfilled.

The reasons of this are that other than the ionic radius of the above-described version of SHANNON, et al, there is also a version of Polling, et al, and there is a big difference in normal values for these versions, thus limiting consideration on only the ionic radius of Li is problematic in terms of character itself, and that Li is an original constitutional element and particularly in the $LiMn_2O_4$ system, Li is deemed to substitute the position of Mn, and further that it is experimentally possible to solid-solubilize Li.

Incidentally, as concerns substitution elements M, in theory, Li is to become a +1 valence ion, Fe, Mn, and Ni, Mg, and Zn are +2 valence ions, B, Al, Co, and Cr are +3 valence ions, Si, Ti, and Sn are +4 valence ions, P, V, Sb, Nb, and Ta are +5 valence ions, and Mo and W are +6 valence ions, and they all are elements to be solid-solubilized in $LiM_ZMe_{X-Z}O_Y$. However, for Co and Sn, they can be +2 valence ions, and for Fe, Sb and Ti, they can be +3 valence ions and for Mn they can be +3 and +4 valence ions, and for Cr they can even be +4 and +6 valence ions.

Therefore, as seen in an actual positive active material, in the case where there exists a part of ionic valence subject to change in valence values due to various crystallographic deficiencies, in some cases there is a possibility that an average valence of substitution elements M might not coincide with theoretic valence value, e.g. 3.5 for lithium manganese oxide and 3 for lithium cobalt oxide as well as lithium nickel oxide, of a transition element Me prior to complex substitution.

For example, since Ti can exist comparatively stably under +3 valence condition in addition to +4 valence condition, in the case where Ti has been solid-solubilized in $LiM_ZMe_{X-Z}O_Y$ under the condition having such mixed atomic valence, the average valence of Ti falls in a range between +3 to +4. And as concerns Fe, since Fe remains equally stable under +2 and +3 valence condition and it is also known that the status of +4 valence exists stably in a certain chemical compound, the average valence of Fe in $LiM_ZMe_{X-Z}O_Y$ is to fall in a range between +2 to +4. In addition, similarly, also as concerns quantity of oxygen in $LiM_ZMe_{X-Z}O_Y$, it may exist in deficit or in excess within a range to sustain a crystal configuration.

Incidentally, as a lithium transition metal compound to be used in the present invention, lithium manganese oxide, lithium cobalt oxide, and lithium nickel oxide may be nominated in particular. Here as concerns lithium manganese oxide, a lithium manganese oxide ($LiMn_2O_4$) having a spinel configuration of cubic system is suitably used. In $LiMn_{2O4}$, one Mn in two units of Mn is in the state of +3 valence while the other Mn is in the state of +4 valence state. Accordingly, in complex substitution, two cases can be considered, namely a case where substitution elements M is used for substitution of Mn in this +3 valence state, and a case involving substitution of Mn in +4 valence state.

An average valence value of the substitution elements M is 3 in the case where complex substitution of +3 valence Mn takes place, but here at least elements to become ions with other than +3 valence is included in the substitution elements M. For example, such cases that two units of +3 valence Mn undergo complex substitution with one +2 valence Mg and +4 valence Ti, and two units of +3 valence Mn undergo substitution with one +1 valence Li and one +5 valence V can be nominated. And in the case where a +3 valence Mn undergoes complex substitution with such an element having other than +3 valence, it is permitted that the remaining +3 valence Mn is substituted with another +3 valence ion. Here, an average valence is referred to an average value of ion valence of not less than two different substitution elements M in a positive active material and is determined, putting their existence ratio under consideration.

Likewise, for the purpose that +4 valence Mn undergoes complex substitution, it is necessary that substitution has taken place with at least an element to provide a valence value other than +4 valence, and thereafter the remaining +4 valence Mn may be substituted with an element to provide the same +4 valence. In general, in complex substitution of $LiMn_2O_4$, at least it is necessary that the ionic valence of the substitution elements M numbered 1 is not more than 3 and the ionic valence of another substitution elements M is not less than 4, consequently resulting in the average valence of only substitution elements M to be ranged from not less than 3 to not more than 4, and the average valence value obtained from the substitution elements M after complex substitution inclusive of Mn being 3.5.

On the other hand, since the substitution elements M to make a portion of Co or Ni in lithium cobalt oxide ($LiCoO_2$), and lithium nickel oxide ($LiNiO_2$) undergo complex substitution is to provide an average valence value of 3, similarly in the above-described substitution of +3 valence Mn, the substitution elements M are to include elements to provide ions with at least other than +3 valence. Therefore, the case where all the substitution elements M have ionic valence value of 3 valence is excluded from complex substitution of the present invention.

In the case where a battery has been assembled using a positive active material which had undergone such complex substitution, there reveals an effect with remarkable reduction of internal resistance. This is deemed to be caused by that electronic conductivity is improved in the frame of lithium transition elemental composite compound (a portion exclusive of Li attributable to ionic conduction), and thus velocity of detachment and insertion of Li ions in battery reaction has become faster. And considering that the lattice constant gets small due to complex substitution, the improvement of electronic conductivity in this frame is presumed to heavily depend on that in the case where transition elements Me each other and/or substitution elements M are transition metal elements, the d orbital between substitution elements M and a transition element Me is apt to overlap, which makes it easier to smoothly proceed with the movement of electron by use of this d orbital.

In addition, repeating charge and discharge of a battery assembled by use of materials which have undergone complex substitution, no deterioration is observed, compared with the case involving use of materials which have not undergone complex substitution, and therefore, it is deemed that complex substitution does not negatively affect stability of the frame. Moreover, in $LiMn_2O_4$, as shown in the below-described embodiments, the cycle characteristics have been improved, thus it is deemed that complex substitution attributes to improvement of reversibility of crystal lattice associated with insertion and detachment of Li ions.

Incidentally, compared with the case where a portion of the transition element Me is substituted by another element (hereinafter, such substitution involving one element is referred to as "single element substitution according to complex substitution, such a problem that positive capacity might be reduced by larger volume of substitution in single element substitution can be avoided. Next, this example is explained by use of $LiMn_2O_4$, but it goes without saying that the explanation may be made to $LiCoO_2$ and $LiNiO_2$.

In the case where $Mn^{3+}$ in $LiMn_2O_4$ has undergone single element substitution with an element having valence value of not more than two valence, e.g. one valence ion such as $Li^+$, charge equivalent to +2 valence value, being a difference of charge with $Mn^{3+}$, will be in short, thus for the purpose of maintaining electrical neutrality of materials, two units of $Mn^{3+}$ will be changed to $Mn^{4+}$. Thus, consequently, one $Li^+$ will be substituted with $Mn^{3+}$ and solid-solubilized, resulting in reduction of approximately three units of $Mn^{3+}$.

Here, in $LiMn_2O_4$, it is deemed that, at the time of charging, electrical neutrality of materials is maintained by compensating shortage of charge due to detachment of $Li^+$ with $Mn^{3+}$ being changed to $Mn^{4+}$, and at the time of discharging reverse reaction takes place. In short, the quantity of $Mn^{3+}$ in $LiMn_2O_4$ determines the positive capacity, and a quantity of $Li^+$ corresponding to $Mn^{3+}$ attributes charging and discharging reaction. Therefore, for the purpose that $Li^+$ is detached from a crystal lattice or inserted into a crystal lattice, it will become necessary that a change in valence value takes place in cations other than $Li^+$, namely substitution elements M and/or transition element Me.

However, in the previous embodiment, $Li^+$ which was substituted with $Mn^{3+}$ has not undergone change in valence value, consequently $Mn^{3+}$ remains in short by three units. Therefore, 3 units of $Li^+$ will not attribute to charging and discharging reaction. In short, consequently there arises a problem that the positive capacity is reduced in excess of quantity of substitution. Such a problem similarly takes place in single element substitution involving +2 valence ions.

On the other hand, in complex substitution of the present invention, substitution elements M are to be narrowed to Li, Fe, Mn, Ni, Mg, Zn, Si, Ti, Sn, P, V, Sb, Nb, Ta, Mo, and W (hereinafter these substitution elements M are referred to as "substitution elements group within a reduced range"), and not less than two elements are arranged to be selected, then in addition to an effect that improves electronic conductivity, the above-described problem that the positive capacity is reduced in excess of quantity of element substitution is avoided.

In short, when ions with +1 valence or +2 valence and ions with +4 to +6 valence are combined, as concerns shortage of positive charge caused by solid-solubilizing ions with +1 valence or +2 valence, the charge is not compensated by change of $Mn^{3+}$ to $Mn^{4+}$, but ions with +4 to +6 valence are solid-solubilized and compensated, thus without reducing the positive capacity as a result of reducing the number of $Mn^{3+}$ in excess of substitution quantity, Mn can undergo substitution.

For example, in the case where two units of $Mn^{3+}$ are substituted by one $Li^+$ and one $V^{5+}$, reduction of positive capacity is limited to a reduced volume of two units of $Mn^{3+}$, and it will become possible to make quantity of reduction of $Mn^{3+}$ lesser than reduction by three units of $Mn^{3+}$ in the case where one $Mn^{3+}$ has undergone single element substitution with one $Li^+$. In addition, in the case where two units of $Mn^{3+}$ have been substituted with one $Mg^{2+}$ and one $Ti^{4+}$, reduction of positive capacity is limited to reduction covering two units of $Mn^{3+}$, and is less than reduction of four units of $Mn^{3+}$ in the case where two units of $Mn^{3+}$ have been substituted with two units of $Mg^{2+}$. Thus, reduction quantity of $Mn^{5+}$ is equivalent to substitution quantity of elements, and accordingly such event that reduction in positive capacity exceeds substitution quantity is to be avoided.

Here, in complex substitution, when at least Ti is arranged to be included as substitution elements M, a remarkable effect of improvement on electronic conductivity is obtainable and preferable. In addition, Ti can be effectively used to prevent a drop in positive capacity, which is preferable.

In $LiM_ZMe_{X-Z}O_Y$ including not less than two kinds of substitution elements M obtainable when complex substitution using elements among the above-described substitution elements group within a reduced range, a portion of remaining transition elements Me may further be substituted with at least not less than one element selected from B, Al, Co, and Cr. In this case, complex substitution involving at least three kinds of element is to take place.

These elements such as B and Al, etc. exist in $LiM_ZMe_{X-Z}O_Y$ as ions with +3 valence in theory. But, as described above, in actual positive active materials, the ion valence value does not always have to correspond with the theoretic valence values. Ions with +3 valence are substituted with $Mn^{3+}$ one on one, therefore, decrease in positive capacity is the same as the quantity of substitution, and decrease in positive capacity not less than the quantity of substitution does not take place, and on the other hand, the said ion attributes to improvement of electron conductivity of a positive active material itself. Incidentally, in the case where $LiMn_2O_4$ is used, an effect that its crystal configuration is made reversible toward insertion and detachment of $Li^+$ is provided.

Next, substitution quantity Z in complex substitution is explained. In the present invention, it is preferred that Z/X, the ratio of the quantity Z to be substituted by substitution elements M to the quantity X of the original transition element Me fulfills the condition of $0.005 \leq Z/X \leq 0.3$. When Z/X is less than 0.005, resistance of a positive active material does not drop, and improvement in cycle characteristics rarely appears. In short, no effects of complex substitution appear. On the other hand, when Z/X is more than 0.3, in synthesis of a positive active material, production of a different phase is admitted through powder X-ray diffraction method (XRD), and a single phase material was not obtainable. In a battery, such a different phase only increases the weight of a positive active material and does not attribute to battery reaction, thus it goes without saying that production of a different phase at the time of synthesis together with entry to the battery should be avoided.

Positive-active-material-wise, in particular, when $LiMn_2O_4$ has been used, the substitution quantity Z preferably fall within a range of $0.01 \leq Z \leq 0.5$, and further preferably to falls in a range of $0.1 \leq Z \leq 0.3$, and when $LiCoO_2$ as well as $LiNiO_2$ is used, the substitution quantity Z preferably falls within a range of $0.005 \leq Z \leq 0.3$, and further preferably to falls in a range of $0.05 \leq Z \leq 0.3$, and within the respective preferable ranges of the substitution quantity Z, there remarkably appears an effect of improvement of electronic conductivity of a positive active material, which is preferable.

Incidentally, when elemental substitution by not less than one element selected from B, Al, Co, and Cr further took place as well after complex substitution, the total substitution quantity (Z+W) of substitution quantity Z of substitution elements M selected from a group of substitution elements within a reduced range, and the substitution quantity (to be referred to as "w") of B and Al, etc. is required to fulfill a relationship of $0.01 \leq Z+w-0.5$.

Incidentally, $LiM_ZMe_{X-Z}O_Y$ to be used in a lithium secondary battery of the present invention, is composed by firing a mixed compound comprising salts and/or oxides of each element (substitution elements M as well as Li and transition element Me) having been prepared with a predetermined ratio in oxidation atmosphere at a temperature range of 600° C. to 1000° C., for 5 hours to 50 hours, and thus a single phase product can be obtained. Here, an oxidation atmosphere is referred to as an atmosphere having partial pressure of oxygen with which generally a sample inside a furnace is brought into oxidation reaction. In synthesis of $LiCoO_2$ as well as $LiNiO_2$, it is preferable that the partial pressure of oxygen is set at not less than 10%, and, in particular, air atmosphere and oxygen atmosphere, etc. are applicable.

Incidentally, when the firing temperature is as low as less than 600° C., a peak showing residue of raw material, e.g. peak of lithium carbonate ($Li_2CO_3$) in the case where $Li_2CO_3$ is used as a lithium source, is to be observed in XRD chart of fired product, and no single phase products can be obtained. On the other hand, when the firing temperature is as high as more than 1000° C., high temperature phase is produced in other than a compound of the targeted crystal system, and a single phase product will become no longer obtainable.

In addition, firing may be conducted, being divided into not less than twice. In that case, it is preferable that the firing is proceeded with the firing temperature for the forthcoming step to be set higher than that for the previous step, and the final firing is to be conducted under a firing condition involving an oxidation atmosphere at a temperature range of 600° C. to 1000° C., for 5 hours to 50 hours. Thus, in the case of firing taking place twice, for example, applying this condition of second firing temperature as well as firing period, the product obtainable when synthesis has been conducted with the temperature for the second firing to be set at not less than the temperature for the first firing features steeper projection in the peak shape in the XRD chart than with the product obtainable when a single firing yields, and as a result improvement of crystallinity can be planned.

A salt for each element will not be limited in particular, but it goes without saying that those having intensive purity and further being inexpensive as raw materials are preferably to be used. Accordingly, such carbonate, hydroxide, and organic acid/salt that do not produce harmful decomposition gas at the times of elevation of temperature or filing are preferably used. However, nitrate, hydrochloride, and sulfate, etc. are not always unusable. Generally, in synthesis of $LiCoO_2$ and $LiNiO_2$, it is known that synthesis temperature goes down with usage of salts instead of oxides as raw materials. Here, as concerns raw materials on Li, usually an oxide $Li_2O$ is chemically unstable, and thus it is rarely used.

As the foregoing, implementation of complex substitution of the present invention will make improvement in electronic conductivity of a positive active material easier to plan, providing preferable electric characteristics, and resulting in decrease in internal resistance of a battery. In addition, the problem that positive capacity might be reduced by larger volume of element substitution in single element substitution which conventionally used to be problematic in single element substitution, is to be solved, and reduction of positive capacity is to be suppressed to the extent equivalent to quantity of element substitution. At the same time, as concerns $LiMn_2O_4$, reversibility of crystal configuration for insertion and detachment of $Li^+$ is improved, thus cycle characteristics as a battery are improved. Accordingly, decrease with the passage of time in battery capacity due to repetition of charging and discharging is controlled.

Reduction of internal resistance and reservation of positive capacity, and increase in cycle characteristics are planned in such a battery, which is used as a motor driving power source for an EV or an HEV in particular, consequently providing with an excellent effect that predetermined running performance such as acceleration performance as well as slope-climbing performance, etc. is maintained, and continuous running distance per for charging is kept for long.

Incidentally, other materials to be used for production of a battery are not limited whatsoever, and conventionally known various materials can be used. For example, as a negative active material, an amorphous carbon material such as soft carbon or hard carbon, or carbon material such as artificial graphite such as high graphitized carbon material, etc. and natural graphite, etc. are used.

And as an organic electrolyte a carbonic acid ester family such as ethylene carbonate (EC), diethyle carbonate (DEC), and dimethyle carbonate (DMC), and the one in which one or more kinds of lithium fluoride complex compound such as $LiPF_6$, and $LIBF_4$, etc. or lithium halide such as $LiClO_4$ as an electrolyte are dissolved in a single solvent or mixed solvent of organic solvents such as propylene carbonate (PC), γ-butyrolactone, tetrahydrofuran, and acetonitrile, etc., can be used.

EXAMPLE

Successively, taking as a major embodiment complex substitution involving two kinds of elements as substitution elements M including Ti which provides most remarkable effect in the present invention, based on whose experimental results an explanation is provided as follows:
(Synthesis of Positive Active Material $LiM_zMn_{2-z}O_4$)

As the starting raw material, powder of commercially available $Li_2CO_3$, $MnO_2$, $TiO_2$, MgO, and NiO was used and was weighed and mixed so that the positive active material composition of respective embodiments shown in Table 1 (positive active materials for measurement of internal resistance ratio), Table 2 (positive active materials for measurement of capacity of the initial charging), and Table 3 (positive active materials for a cycle test) might be obtained, and firing took place at 800° C. in an air atmosphere for 24 hours, and the positive active materials were obtained. Here, when the combination of substitution elements M took place involving Ti and Mg or Ni, the mixing ratio of them was set at Ti:Mg or Ni=1:1, and for the case involving Li and Ti, it was set at Li:Ti=1:2. Incidentally, for the purpose of comparing the effects of complex substitution and single element substitution, positive active materials where a portion of Mn underwent single element substitution with Mg, Ti, Ni, and Li respectively as well as $LiMn_2O_4$ which did not undergo element substitution were formed under the similar conditions.

TABLE 1

|  | Positive active material composition | Internal resistance ratio of coin cells (%) |
|---|---|---|
| Comparative example 1 | $LiMn_2O_4$ | 100 |
| Embodiment 1 | $Li(Mg_{0.5}Ti_{0.5})_{0.01}Mn_{1.99}O_4$ | 54 |
| Embodiment 2 | $Li(Mg_{0.5}Ti_{0.5})_{0.10}Mn_{1.90}O_4$ | 37 |
| Embodiment 3 | $Li(Mg_{0.5}Ti_{0.5})_{0.15}Mn_{1.85}O_4$ | 35 |
| Embodiment 4 | $Li(Mg_{0.5}Ti_{0.5})_{0.30}Mn_{1.70}O_4$ | 29 |
| Embodiment 5 | $Li(Mg_{0.5}Ti_{0.5})_{0.50}Mn_{1.50}O_4$ | 41 |
| Embodiment 6 | $Li(Ni_{0.5}Ti_{0.5})_{0.01}Mn_{1.99}O_4$ | 52 |
| Embodiment 7 | $Li(Ni_{0.5}Ti_{0.5})_{0.10}Mn_{1.90}O_4$ | 36 |
| Embodiment 8 | $Li(Ni_{0.5}Ti_{0.5})_{0.15}Mn_{1.85}O_4$ | 36 |
| Embodiment 9 | $Li(Ni_{0.5}Ti_{0.5})_{0.30}Mn_{1.70}O_4$ | 30 |
| Embodiment 10 | $Li(Ni_{0.5}Ti_{0.5})_{0.50}Mn_{1.50}O_4$ | 45 |

TABLE 1-continued

| | Positive active material composition | Internal resistance ratio of coin cells (%) |
|---|---|---|
| Comparative example 2 | $LiMg_{0.15}Mn_{1.85}O_4$ | 80 |
| Comparative example 3 | $LiTi_{0.15}Mn_{1.85}O_4$ | 69 |
| Comparative example 4 | $LiNi_{0.15}Mn_{1.85}O_4$ | 71 |

TABLE 2

| | Positive active material composition | Capacity of the initial charging (mAh/g) |
|---|---|---|
| Embodiment 3 | $Li(Mg_{0.5}Ti_{0.5})_{0.15}Mn_{1.85}O_4$ | 102 |
| Embodiment 12 | $Li(Li_{0.33}Ti_{0.07})_{0.15}Mn_{1.85}O_4$ | 102 |
| Comparative example 2 | $LiMg_{0.15}Mn_{1.85}O_4$ | 85 |
| Comparative example 3 | $LiTi_{0.15}Mn_{1.85}O_4$ | 105 |
| Comparative example 5 | $LiLi_{0.15}Mn_{1.85}O_4$ | 70 |

TABLE 3

| | Positive active material composition | Capacity ratio toward capacity of the initial charging of a battery after 100 cycles |
|---|---|---|
| Embodiment 2 | $Li(Mg_{0.5}Ti_{0.5})_{0.10}Mn_{1.90}O_4$ | 0.69 |
| Embodiment 3 | $Li(Mg_{0.5}Ti_{0.5})_{0.15}Mn_{1.85}O_4$ | 0.84 |
| Embodiment 4 | $Li(Mg_{0.5}Ti_{0.5})_{0.30}Mn_{1.70}O_4$ | 0.83 |
| Embodiment 5 | $Li(Mg_{0.5}Ti_{0.5})_{0.50}Mn_{1.50}O_4$ | 0.73 |
| Embodiment 11 | $Li(Li_{0.33}Ti_{0.67})_{0.10}Mn_{1.90}O_4$ | 0.71 |
| Embodiment 12 | $Li(Li_{0.33}Ti_{0.67})_{0.15}Mn_{1.85}O_4$ | 0.85 |
| Embodiment 13 | $Li(Li_{0.33}Ti_{0.67})_{0.30}Mn_{1.70}O_4$ | 0.82 |
| Embodiment 14 | $Li(Li_{0.33}Ti_{0.67})_{0.50}Mn_{1.50}O_4$ | 0.70 |
| Comparative example 2 | $LiMg_{0.15}Mn_{1.85}O_4$ | 0.68 |
| Comparative example 3 | $LiTi_{0.15}Mn_{1.85}O_4$ | 0.66 |
| Comparative example 5 | $LiLi_{0.15}Mn_{1.85}O_4$ | 0.69 |

Synthesis of Positive Active Materials $LiM_zCo_{1-z}O_2$ and $LiM_zNi_{1-z}O_2$ As the starting raw material, commercially available $Li_2CO_3$, $Co_3O_4$, NiO, MgO, and $TiO_2$ were used and were weighed and mixed so that the composition of respective kinds of embodiments shown in Table 4 as well as Table 5 (positive active materials for measurement of internal resistance ratio) might be obtained. And as concerns $LiM_zCo_{1-z}O_2$, firing took place at 900° C. in an air atmosphere for 20 hours, and on the other hand as concerns $LiM_zNi_{1-z}O_2$, firing took place at 750° C. in an oxygen atmosphere for 20 hours to proceed with synthesis. In addition, as put down in Table 4 as well as Table 5, $LiCoO_2$ as well as $LiNiO_2$ in which no addition elements were added, and also samples related to Examples undergoing single element substitution were synthesized under the similar conditions. The formed respective kinds of positive active materials of Embodiments as well as Comparative examples were confirmed to be in a single phase through XRD.

TABLE 4

| | Positive active material composition | Internal resistance ratio of coin cells (%) |
|---|---|---|
| Comparative example 6 | $LiCoO_2$ | 100 |
| Embodiment 15 | $Li(Mg_{0.5}Ti_{0.5})_{0.005}Co_{0.995}O_2$ | 86 |
| Embodiment 16 | $Li(Mg_{0.5}Ti_{0.5})_{0.05}Co_{0.95}O_2$ | 69 |
| Embodiment 17 | $Li(Mg_{0.5}Ti_{0.5})_{0.25}Co_{0.75}O_2$ | 65 |
| Embodiment 18 | $Li(Mg_{0.5}Ti_{0.5})_{0.3}Co_{0.7}O_2$ | 73 |
| Embodiment 19 | $Li(Ni_{0.5}Ti_{0.5})_{0.005}Co_{0.995}O_2$ | 88 |
| Embodiment 20 | $Li(Ni_{0.5}Ti_{0.5})_{0.05}Co_{0.95}O_2$ | 63 |
| Embodiment 21 | $Li(Ni_{0.5}Ti_{0.5})_{0.25}Co_{0.75}O_2$ | 59 |
| Embodiment 22 | $Li(Ni_{0.5}Ti_{0.5})_{0.3}Co_{0.7}O_2$ | 67 |
| Comparative example 7 | $LiMg_{0.05}Co_{0.95}O_2$ | 90 |
| Comparative example 8 | $LiTi_{0.05}Co_{0.95}O_2$ | 87 |
| Comparative example 9 | $LiNi_{0.05}Co_{0.95}O_2$ | 94 |

TABLE 5

| | Positive active material composition | Internal resistance ratio of coin cells (%) |
|---|---|---|
| Comparative example 10 | $LiNiO_2$ | 100 |
| Embodiment 23 | $Li(Li_{0.33}Ti_{0.67})_{0.005}Ni_{0.995}O_2$ | 91 |
| Embodiment 24 | $Li(Li_{0.33}Ti_{0.67})_{0.05}Ni_{0.95}O_2$ | 77 |
| Embodiment 25 | $Li(Li_{0.33}Ti_{0.67})_{0.25}Ni_{0.75}O_2$ | 72 |
| Embodiment 26 | $Li(Li_{0.33}Ti_{0.67})_{0.3}Ni_{0.7}O_2$ | 80 |
| Comparative example 11 | $LiTi_{0.05}Ni_{0.95}O_2$ | 93 |
| Comparative example 12 | $LiLi_{0.05}Ni_{0.85}O_2$ | 110 |

Forming of a Battery

At first, using the formed various kinds of positive active materials, and mixing a positive active materials, acetylene black powder being conductive material, and polyvinylidene fluoride being bonding material with a weight ratio of 50:2:3 to form a positive material. A disk shape having diameter of 20 mmφ was prepared as a positive pole by press-forming 0.02 g of the said positive material under a pressure of 300 kg/cm². Next, in accordance with test purposes, as described below, two kinds of coin cells were formed. In short, the coin cells for measuring internal resistance set forth in Table 1, Table 4, and Table 5 as well as the coin cells for cycle tests set forth in Table 3 were formed by using a positive pole having been formed as described above, an electrolyte having been formed by dissolving $LIPF_6$ being an electrolyte into an organic solvent with ethylene carbonate and diethyle carbonate being mixed with a same volume ratio to constitute a density of 1 mol/L, a negative pole made of carbon, and a separator separating the positive electrode and the negative pole.

On the other hand, the coin cells for measuring the capacity for initial charging set forth in Table 2 was formed by using a positive pole having been formed, an electrolyte having been formed by dissolving $LiClO_4$ being an electrolyte into propylene carbonate to constitute a density of 1 mol/L, a negative pole made of metal Li, and a separator separating the positive pole and the negative pole.

Method to Measure a Battery's Internal Resistance and the Results Thereof

As concerns coin cells having been formed as described above, using respective kinds of positive active materials set forth in Table 1, Table 4 and Table 5, only one cycle of charging and discharging test was conducted, involving charging constant current of 1 C rate and constant voltage of 4.1 V in accordance with the capacity of a positive active material, and similarly discharging constant currenct of 1 C rate and constant voltage 2.5 V, and the battery's internal resistance was obtained by dividing difference between the potential at a resting state after finishing charging and the potential immediately after commencement of discharging (potential difference) with discharging currency. And the internal resistance of a battery using a positive active material which underwent single element substitution and complex substitution was divided by the internal resistance of a battery using a conventional compound which did not undergo elemental substitution respectively ($LiMn_2O_4$, $LiCoO_2$, and $LiNiO_2$) to yield a value, which was stipulated as an internal resistance ratio. Accordingly, as the value of internal resistance ratio gets smaller, reduction effect on internal resistance gets larger. The results have been put down in Table 1, Table 4, and Table 5, respectively.

Based on Table 1, as concerns $LiMn_2O_4$, in the case where positive active materials having undergone single element substitution were used, in other words, in the case where the embodiments 1 through 10 having involved positive active materials having undergone complex substitution while internal resistance in comparative examples 2 through 4 has halted at approximately 70% at the best, it is obvious that the substitution quantity Z has fallen in the range of $0.01 \leq Z \leq 0.5$, and the internal resistance ratio has been decreased to reach not more than approximately 50%. In addition, as shown in embodiments 2 through 4 as well as embodiments 7 through 9, in the case where complex substitution has taken place so that substitution quantity Z may fall in the range of $0.1 \leq Z \leq 0.3$, it is obvious that remarkable reduction effect in internal resistance has been obtained.

Based on Table 4, as concerns $LiCoO_2$, compared with comparative examples 7 through 9 where single element substitution took place, it was confirmed that remarkable reduction in internal resistance appeared in embodiments 15 through 22 where complex substitution took place. And, as shown in embodiments 16 through 18 as well as embodiments 20 through 22, for the range of $0.1 \leq Z \leq 0.3$, Z being substitution quantity, remarkable reduction effect in internal resistance has appeared. Incidentally, in the case where $LiCoO_2$ is the basic material, reduction effect in internal resistance has been limited to a small extent, compared with the case involving $LiMn_2O_4$.

The value of internal resistance ratio obtained by single element substitution as well as complex substitution having used $LiNiO_2$ as the basic material has been similar to the case having involved $LiCoO_2$, and compared with comparative examples 11 and 12 where single substitution took place, the internal resistance ratio has been reduced to a large extent in embodiments 23 through 26 where complex substitution took place, and as shown in embodiments 24 through 26, for the range of $0.05 \leq Z \leq 0.3$, Z being substitution quantity, a reduction effect in internal resistance has appeared to a large extent. However, as in the case of is $LiCoO_2$, compared with the case using $LiMn_{2O4}$, the effect of decrease in internal resistance is little.

From these results, complex substitution by not less than two kinds selected from the group consisting of Li, Fe, Cr, Mn, Ni, Mg, Zn, B, Al, Co, Cr, Si, Ti, Sn, P, V, Sb, Nb, Ta, Mo, and W has been conducted, and forming of positive active materials through measurement of internal resistance by the method similar to the one described above, and as a result the tendency similar to the case involving complex substitution having shown in Table 1 was confirmed.

Measurement of a Battery's Internal Charging Capacity and the Results Thereof

As concerns coin cells having been formed as previously described, using positive active materials set forth in Table 2, the initial charging capacity (battery capacity) was measured, involving charging to reach 4.2 V at a constant currency and constant voltage of 0.2 C rate in accordance with the capacity of a positive active material. The results have been put down in Table 2. Based on these results, it is obvious that in the case where element substitution quantity as a whole is same, compared with single element substitution by $Li^+$ and $Mg^{2+}$ respectively, battery capacity has got large in the case where complex substitution took place, however, in the case involving single element substitution by $Ti^{4+}$, battery capacity approximately equivalent to that in the case involving complex substitution has especially been obtained.

It is deemed that in single element substitution respectively by $Li^+$ and $Mg^{2+}$, as previously described, reduction in $Mn^{3+}$ in the quantity not less than element substitution quantity has reduced $Li^+$ attributable to charging and discharging, and thus has reduced battery capacity, nevertheless, complex substitution has shown that it has controlled the said reduction in capacity. It is deemed on the other hand that in the case involving single element substitution by $Ti^{4+}$, most portion of $Ti^{4+}$ has undergone change in valence value to $Ti^{3+}$ at the time of firing, and thus, substitution between $Ti^{3+}$ and $Mn^{3+}$ have made available the battery capacity equivalent to that obtainable in complex substitution.

Having this result in hand, complex substitution by not less than two elements selected from the group consisting of Li, Fe, Cr, Mn, Ni, Mg, Zn, Si, Ti, Sn, P, V, Sb, Nb, Ta, Mo, and W has been conducted, and forming of positive active materials through assessment of battery capacity was conducted by the method similar to the one described above, and as a result the characteristics similar to the case involving complex substitution having shown in Table 2 were obtained.

In addition, for the purpose of looking into a range of composition where reduction controlling effect on battery capacity by complex substitution appears, experiments similar to those described above with variety of substitution quantity Z, it became obvious that the substitution quantity Z preferably fell in the range of $0.01 \leq Z \leq 0.5$. In the case where the substitution quantity Z exceeded 0.5, in any combination of substitution elements M, production of compounds other than those in the spiner phase was confirmed by XRD.

Cycle Operation test and the Results Thereof

Successively, further for the purpose of looking into cycle characteristics in a substitution quantity Z where an effect of complex substitution reveals, as concerns batteries having been formed as previously described, using positive active materials having respective compositions set forth in Table 3, a cycle operation test was conducted, repeating charging constant current of 1 C rate and constant voltage of 4.1 V and likewise discharging constant current of 1 C rate and constant voltage of 2.5 V in accordance with the capacity of a positive active material.

In Table 3, discharging capacity of a battery after the consummation of 100 cycles has been put down in terms of ratio toward the initial discharging capacity of a battery. Consequently, as this ratio gets larger, reduction in battery's discharging capacity is deemed to get less. As shown in Table 3, it became obvious that in a battery where positive active materials having undergone complex substitution were used, reduction quantity in battery's discharging capacity is as a whole smaller than in the case involving positive active materials having undergone single element substitution, and the said reduction was little especially within a range of $0.1 \leq Z \leq 0.3$, Z being substitution quantity, and it became obvious that positive active materials having undergone complex substitution so as to comprise such compositions showed good cycle characteristics as a battery.

As described above, according to a lithium secondary battery of the present invention, sizable reduction in battery's internal resistance is realized since materials with improved electronic conductivity as well as low resistance which have been obtained with transition elements in a lithium transition metal compound having undergone complex substitution have been used as positive active materials. In addition, according to the present invention, reduction in positive capacity in excess of element substitution quantity is controlled. As a result of this, a lithium secondary battery according to the present invention serves to provide extremely excellent effects such as large output, huge capacity as well as improved and good charge- discharge cycle characteristics, and further with less energy loss at the time of charging and discharging. Incidentally, in the case where $LiMn_2O_4$ has been used, such effect that reversibility of crystal configuration associated with charging and discharging is improved and superior endurance is provided is obtainable.

What is claimed is:

1. A lithium secondary battery comprising a positive active material including a lithium transition metal compound, said compound being represented by the formula $Li(Ni_{x1}Ti_{x2})_ZMn_{2-z}O_4$ wherein z is 0.01 to 0.5, x1=0.5, x2=0.5, and said positive active material has a spinel configuration of the cubic system.

2. A lithium secondary battery according to claim 1, wherein said lithium transition metal compound further comprises Li as an additional element.

3. A lithium secondary battery according to claim 1, wherein said lithium transition metal compound further comprises Mg as an additional element.

4. A lithium secondary battery according to claim 2, wherein said lithium transition metal compound further comprises Mg as an additional element.

5. The lithium secondary battery of claim 1, wherein the average ionic radius of the substitution members is within ≠15 percent of the ionic radius of Mn.

6. The lithium secondary battery according to claim 1, wherein a portion of Mn is substituted further by a least one of B, Al, Co, and Cr.

7. The lithium secondary battery according to claim 1, wherein the lithium transition metal compound is composed by firing a mixed compound comprising salts and/or oxides having been prepared with a predetermined ratio in the presence of oxygen within a temperature range of 600° C. and 1000° C. for 5 hours to 50 hours.

8. The lithium secondary battery according to claim 7, wherein the lithium transition metal compound has been synthesized and obtained by conducting at least first and second firing steps, with the firing temperature of the second step being higher than that of the first step.

9. A lithium secondary battery comprising a positive active material including a lithium transition metal compound, said compound being represented by the formula $Li(Mg_{x1}Ti_{x2})_ZMn_{2-z}O_4$ wherein z is 0.01 to 0.5, x1=0.5, x2=0.5, and said positive active material has a spinel configuration of the cubic system.

10. A lithium secondary battery according to claim 9, wherein said lithium transition metal compound further comprises Li as an additional element.

11. A lithium secondary battery according to claim 9, wherein said lithium transition metal compound further comprises Ni as an additional element.

12. A lithium secondary battery according to claim 10, wherein said lithium transition metal compound further comprises Ni as an additional element.

13. A lithium secondary battery according to claim 9, wherein said lithium transition metal compound is selected from the group consisting of $LiMg_{0.005}Ti_{0.005}Mn_{1.99}O_4$, $LiMg_{0.05}Ti_{0.05}Mn_{1.90}O_4$, $LiMg_{0.075}Ti_{0.075}Mn_{1.85}O_4$, $LiMg_{0.15}Ti_{0.15}Mn_{1.7}O_4$, and $LiMg_{0.25}Ti_{0.25}Mn_{1.5}O_4$.

14. The lithium secondary battery of claim 9, wherein the average ionic radius of the substitution members is within ±15 percent of the ionic radius of Mn.

15. The lithium secondary battery according to claim 9, wherein the lithium transition metal compound is composed by firing a mixed compound comprising salts and/or oxides having been prepared with a predetermined ratio in the presence of oxygen within a temperature range of 600° C. to 1000° C. for 5 hours to 50 hours.

16. The lithium secondary battery according to claim 15, wherein the lithium transition metal compound has been synthesized and obtained by conducting at least first and second firing steps, with the firing temperature of the second step being higher than that of the first step.

\* \* \* \* \*